United States Patent
Takahashi

(10) Patent No.: US 6,819,076 B2
(45) Date of Patent: Nov. 16, 2004

(54) ACTIVE EMI FILTER WITH MAGNETORESISTIVE SENSOR FOR COMMON MODE NOISE CURRENT

(75) Inventor: Toshio Takahashi, Rancho Palos Verde, CA (US)

(73) Assignee: International Rectifier Corporation, El Segundo, CA (US)

(*) Notice: Subject to any disclaimer, the term of this patent is extended or adjusted under 35 U.S.C. 154(b) by 14 days.

(21) Appl. No.: 10/427,152

(22) Filed: Apr. 30, 2003

(65) Prior Publication Data

US 2004/0041534 A1 Mar. 4, 2004

Related U.S. Application Data

(60) Provisional application No. 60/377,438, filed on May 2, 2002.

(51) Int. Cl.[7] ............................ G05B 11/01; H02P 13/00
(52) U.S. Cl. ....................... 318/801; 318/671; 323/284; 324/551; 327/552; 327/100; 363/39; 363/44; 363/100
(58) Field of Search ................................. 318/671, 801, 318/558, 254; 323/284; 324/551; 327/100, 552; 363/39, 44, 100

(56) References Cited

U.S. PATENT DOCUMENTS

| | | | | |
|---|---|---|---|---|
| 4,342,013 A | * | 7/1982 | Kallman | ..................... 333/181 |
| 4,709,233 A | | 11/1987 | Duval | |
| 4,745,539 A | * | 5/1988 | Nilssen | ........................ 363/37 |

(List continued on next page.)

FOREIGN PATENT DOCUMENTS

| | | |
|---|---|---|
| EP | 0 780 960 A1 | 6/1997 |
| EP | 0 809 346 A1 | 11/1997 |
| EP | 0 921 626 A2 | 6/1999 |
| EP | 0 921 626 A3 | 4/2000 |
| JP | 9-266677 | 10/1997 |
| JP | 11-162686 | 6/1999 |
| JP | 11-178327 | 7/1999 |
| JP | 2000-32743 | 1/2000 |

OTHER PUBLICATIONS

Ogasawara, S. Akagh, H., "Modeling and Damping of High–Frequncy Leakage Current PWM Inverter–Fed AC Motor Drive Systems", IEEE Trans. Ind. Applicat., vol. 32 Issue: 5 Sep./Oct. 1996 [abstract] Full Text pp. 1105–1113.
IBM Technical Disclosure Bulletin, "Latch Circuit" Aug. 1962 p. 47.
IBM Technical Disclosure Bulletin, "Analysis of Current–Injected Controlled Multi–Output Switching Converters" Aug. 1990, pp. 58–61.

(List continued on next page.)

*Primary Examiner*—Paul Ip
(74) *Attorney, Agent, or Firm*—Ostrolenk, Faber, Gerb & Soffen, LLP

(57) ABSTRACT

A motor drive including an input for alternating current, a rectifier circuit, an inverter, an output which provides the controlled alternating current to drive a motor; and an active EMI filter for eliminating common mode noise in the motor drive which employs a magneto-resistive sensor. In the filter, a pair of lead frame bars which are connectable to the current path of the motor drive and an MR sensor in the form of a Wheatstone bridge are fabricated on a semiconductor die, with the bridge in contact with and straddling the lead frame bars. The bridge elements are so oriented that opposed elements in the bridge are responsive to changes in magnetic flux in a first sense to exhibit an increase in resistance, and adjacent elements in the bridge are responsive to changes in magnetic flux in a second sense opposite to the first sense to exhibit an increase in resistance. This allows the lead frame bars to be connected in such a manner that the common mode noise signals in the motor drive current path cause flux variations which reinforce the sensor output, while flux variations associated with other signals tend to cancel.

14 Claims, 6 Drawing Sheets

U.S. PATENT DOCUMENTS

| | | | | |
|---|---|---|---|---|
| 4,862,341 A | * | 8/1989 | Cook | 363/37 |
| 4,920,475 A | | 4/1990 | Rippel | |
| 5,038,263 A | | 8/1991 | Marrero et al. | |
| 5,179,362 A | | 1/1993 | Okochi et al. | |
| 5,218,520 A | | 6/1993 | Rozman et al. | |
| 5,227,943 A | * | 7/1993 | Cargille | 361/88 |
| 5,343,079 A | | 8/1994 | Mohan et al. | |
| 5,483,136 A | * | 1/1996 | Marcinkiewicz | 318/558 |
| 5,512,811 A | * | 4/1996 | Latos et al. | 322/10 |
| 5,568,398 A | * | 10/1996 | Trainor | 700/298 |
| 5,574,398 A | | 11/1996 | Hagino et al. | |
| 5,630,220 A | | 5/1997 | Yano | |
| 5,661,390 A | | 8/1997 | Lipo et al. | |
| 5,672,102 A | | 9/1997 | Herald | |
| 5,831,842 A | | 11/1998 | Ogasawara et al. | |
| 6,011,707 A | | 1/2000 | Mine | |
| 6,057,723 A | | 5/2000 | Yamaji et al. | |
| 6,134,126 A | | 10/2000 | Ikekame et al. | |
| 6,151,228 A | | 11/2000 | Miyazaki et al. | |
| 6,154,381 A | * | 11/2000 | Kajouke et al. | 363/65 |
| 6,166,934 A | * | 12/2000 | Kajouke et al. | 363/65 |
| 6,297,971 B1 | | 10/2001 | Meiners | |
| 6,414,857 B2 | | 7/2002 | Motoori | |
| 6,424,207 B1 | | 7/2002 | Johnson | |

OTHER PUBLICATIONS

IBM Technical Disclosure Bulletin, "Differential Current Sensing System For Diagnostic Purposes" Jan. 1981, pp. 3660–3662.

Patent Abstracts of Japan "Ratio Differential Relay Device" Appln. No. 52121125.

"Conducted EMI in PWM Inverter for Household Electric Appliance" Yo–Chan Son et al., Seoul National University, 2001.

"Techniques for Input Ripple Current Cancellation: Classification and Implementation" N. K. Poon et al., IEEE Transactions on Power Electronics, vol. 15, No. 6, Nov., 2000.

"A Novel Active Common–mode EMI Filter for PWM Inverter" Yo–Chan Son et al., Seoul National University, 2001.

"Active EMI Filter for Switching Noise of High Frequency Inverters" Isao Takahashi et al., Nagoaka University of Technology, Jul., 1997.

* cited by examiner

ACTIVE EMI FILTER WITH MAGNETORESISTIVE SENSOR FOR COMMON MODE NOISE CURRENT

RELATED APPLICATIONS

This application claims priority to U.S. Provisional Application No. 60/377,438, filed May 2, 2002, the content of which is incorporated by reference herein, as if fully set forth.

This application is also related to the subject matter of commonly owned U.S. application Ser. No. 09/816,590 filed Mar. 23, 2001 in the name of Brian R. Pelly, entitled ACTIVE FILTER FOR REDUCTION OF COMMON MODE CURRENT, now U.S. Pat. No. 6,636,107, U.S. application Ser. No. 10/146,334 filed May 15, 2002 in the name of Brian R. Pelly, entitled ACTIVE COMMON MODE FILTER CONNECTED IN A.C. LINE, now U.S. Pat. No. 6,690,230, and U.S. application Ser. No. 10/336,157, filed Jan. 2, 2003 in the names of Toshio Takahashi et al. entitled ACTIVE EMI FILTER WITH FEED FORWARD CANCELLATION. The entire disclosures of these applications are hereby incorporated by reference herein as if fully set forth.

BACKGROUND OF THE INVENTION

1. Field of the Invention

The present invention relates to active electromagnetic interference (EMI) filters for motor drives, and more particularly to active EMI filters which employ magnetoresistive bridge circuits to provide very high bandwidth yet are small enough to be easily and conveniently incorporated into integrated circuit (IC) chips in motor drive systems.

2. Relevant Art

Modern motor drives generally utilize pulse width modulation (PWM) switched inverters to generate motor drive currents having precisely controlled characteristics. FIG. 1 shows a simplified schematic diagram of a conventional three-phase PWM motor drive, generally denoted at 10. Here, incoming three-phase A.C. power is provided to a rectifier circuit 12 which provides D.C. to an inverter 14 on buses 16 and 18. The inverter, in turn, provides controlled three-phase A.C. to motor 20.

Numerous inverter designs exist, but these generally incorporate pairs of power semiconductor switches (not shown) such as metal oxide semiconductor field effect transistors (MOSFETS) or insulated gate bipolar transistors (IGBTS) for each motor phase. These are switched on and off by pulse width modulated gate control signals provided by a PWM control circuit 22 which operates in response to current feedback signals from the motor and a speed setpoint signal to vary the duty cycles of the inverter transistors. This technology is well known to persons skilled in the art, and further description will be omitted in the interest of brevity.

One significant problem with PWM inverter motor drives is electromagnetic interference (EMI) in the form of conducted and radiated noise due to the rapid on-off switching of the inverter transistors. With continuing advances in power semiconductor technology, it has become possible to increase to the switching frequencies and the rate of change in the voltage of the inverter transistors. This has the advantage of reducing the acoustic noise of the motors, but the increased switching speed worsens the EMI problem.

To deal with this, EMI filters are conventionally incorporated in motor drives. Initially, these were passive devices employing of inductors and capacitors. In practice, however, in order to provide adequate filtering, large and bulky filter inductors are required. As a consequence, active EMI filters employing current sensors and transistor amplifiers are now customarily employed.

FIG. 2 shows a simplified schematic diagram of a motor drive 30 incorporating an active EMI filter. Here, the active EMI filter 32 is inserted between rectifier 12 and inverter 14. In this circuit, the filter topology is based on so-called feed-forward cancellation and employs complementary transistor switches 32 and 34, a common-mode current sensor 36 including a current transformer (CT) 38 and a sense amplifier 40 to drive the transistor switches. CT 38 is constructed of a core 42 formed of a ferrite material or the like, coupled to the high and low side D.C. buses 16 and 18 of rectifier 12. An output is provided to sense amplifier 40 by a winding 44. Basically, the filter 36 generates a signal which matches and therefore cancels the common mode noise current. This basic concept is also well known. Devices of this kind are shown, for example in the related U.S. patent applications referred to above.

Several different types of current sensor can theoretically be used in an active EMI filter, but in practice, the CT has been the device of choice for sensing common mode noise current because it conveniently provides current-to-current transformation, and galvanic isolation.

EMI can be a serious problem due to the wide adoption of PWM motor drives, and electromagnetic noise compliance standards presently call for effective noise cancellation for conductive common mode emission noise over a frequency range of 150 kHz to 30 MHz. The ability of a CT to meet such requirements depends on the material used for the core. However, to provide a wide range of frequency filtering operation and to accomplish effective cancellation against very fast spike noise current (less than one microsecond), the core must have wide frequency range of transformation characteristics.

The CT also must provide a high fidelity (i.e., low distortion) output to faithfully reproduce fast noise current waveforms. Therefore the core must have good permeability. However, these two performance criteria contradict each other for any soft magnetic material, as a wide frequency range requires reduced permeability of the core material. Thus there must be a trade-off s between linearity (permeability) and frequency range.

Attempts to satisfy this trade-off generally involve use of large cores in an effort to sustain transformation fidelity over a wide frequency operating range. However, when large noise currents are encountered, as in high horse power motor drive systems, the size of the CT becomes large enough that it poses a practical implementation limit. Also, the manual assembly steps associated with the wire windings become an issue and will alos introduce inaccuracy in the curent transformer ratio. Thus, a need still exists for improvement in the current sensors used in active EMI filters. The present invention seeks to satisfy that need.

SUMMARY OF THE INVENTION

It is accordingly an object of the present invention to provide an improved active EMI filter for PWM motor drives.

A further object of this invention is to provide an improved current sensor for active EMI filters which provides very high bandwidth signal transformation in a configuration which permits incorporation in an IC device.

These objects are accomplished according to this invention by providing a common mode current sensor for an active EMI filter in the form of a magneto-resistive (MR) bridge.

Certain nickel-iron alloys such as Permalloy (Ni81Fe19) are known to be magnetoresistive, i.e., to exhibit electrical resistance which depends on the strength and direction of nearby magnetic fields, and it has been proposed to use such devices as current sensors by combining several sensor elements in a Wheatstone bridge mounted in proximity to a current-carrying bus or a current trace on a semiconductor substrate. A reference voltage is applied to the bridge and voltage output, which changes due to the magnetically induced resistance changes, is measured as an indication of an incident magnetic field.

Magnetoresistive sensors of this type are disclosed and claimed in commonly assigned U.S. patent application Ser. No. 10/228,881, filed Aug. 26, 2002 in the name of Jay Goetz, entitled MAGNETORESTSTIVE MAGNETIC FIELD SENSORS. The disclosure of this application is incorporated by reference herein, as if fully set forth.

According to the present invention, it has been found that a properly configured MR device can be used as a common mode current sensor in an active EMI filter. This permits the entire filter to be constructed as an IC device with the MR sensor magnetically coupled to an internal current carrying structure which is connected externally between the rectifier and the inverter in the motor drive.

The sensor is connected to the D.C. output buses of the rectifier 12 so the D.C. flows through two internal lead frame bars of the IC device. However, the D.C. current flows in the same direction through both lead frame bars, while the common node noise current flows in appropriate directions through the buses. As a result, the sensor is responsive only to the common node noise current.

Other features and advantages of the present invention will become apparent from the following description of the invention which refers to the accompanying drawings.

BRIEF DESCRIPTION OF THE DRAWINGS

Throughout the drawings, like part are designated by like reference numerals.

DETAILED DESCRIPTION OF THE INVENTION

Figure 1:
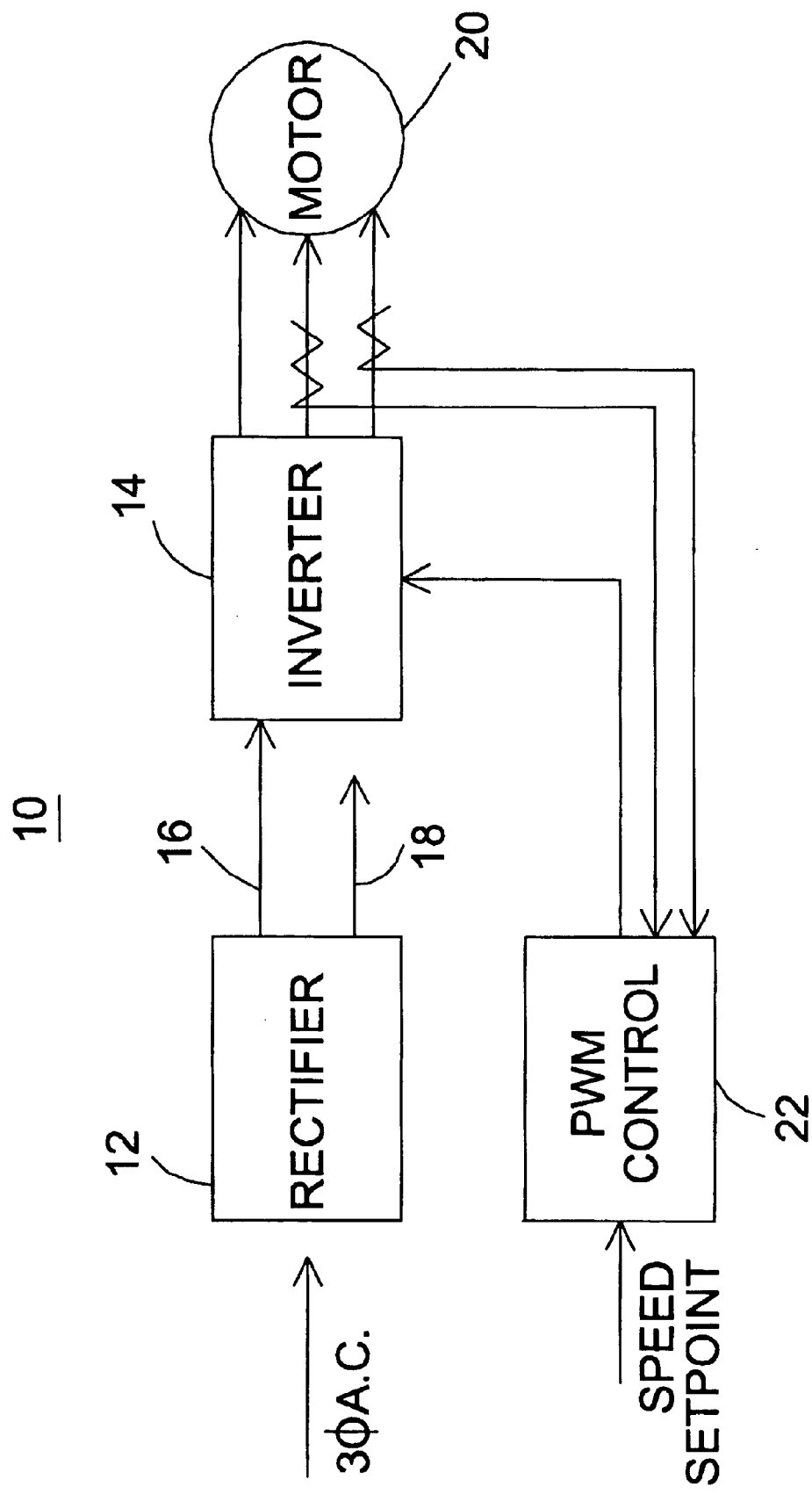
FIG. 1 is a schematic diagram which shows the basic features of a PWM switched motor drive.
Figure 2:
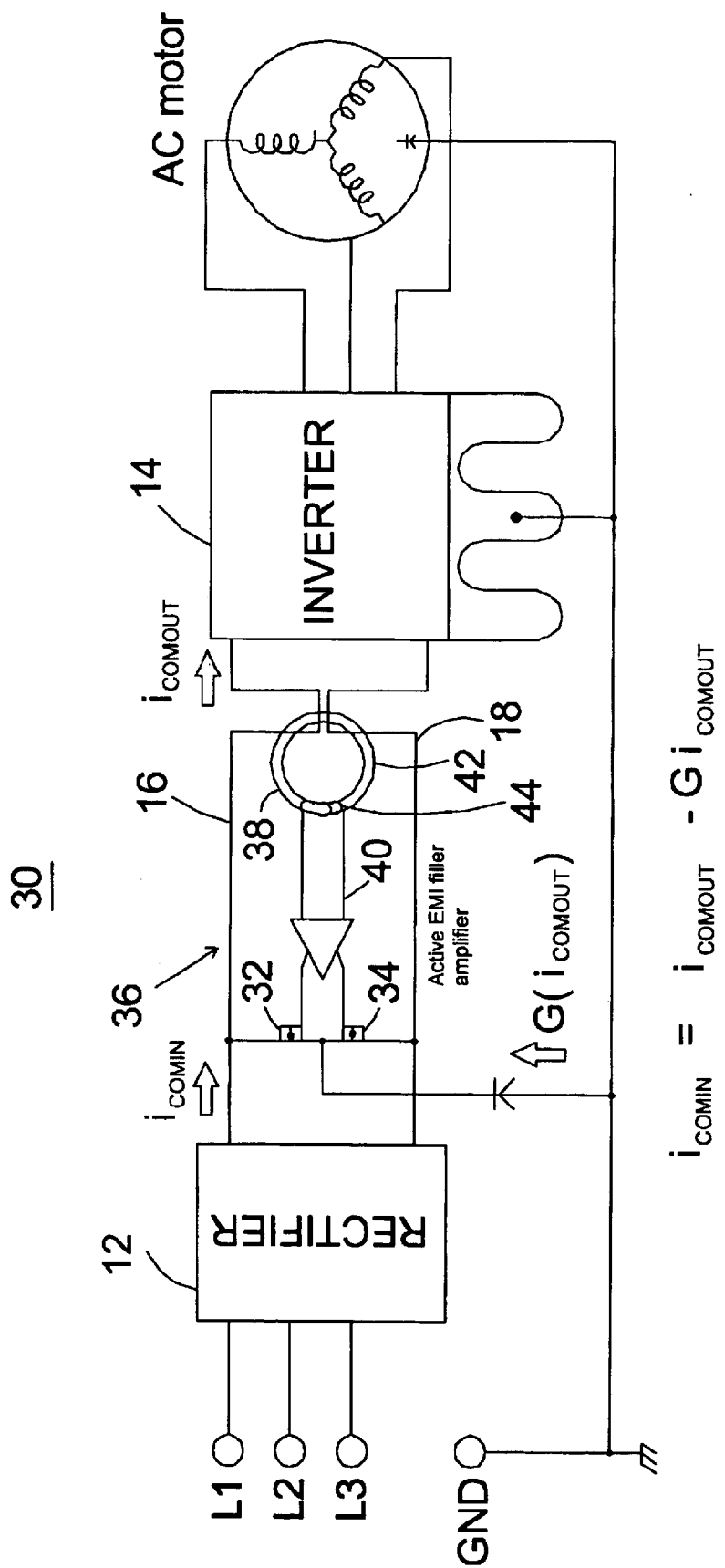
FIG. 2 is a schematic diagram which shows the basic PWM switched motor drive of FIG. 1 modified to incorporate an active EMI filter.
Figure 3:
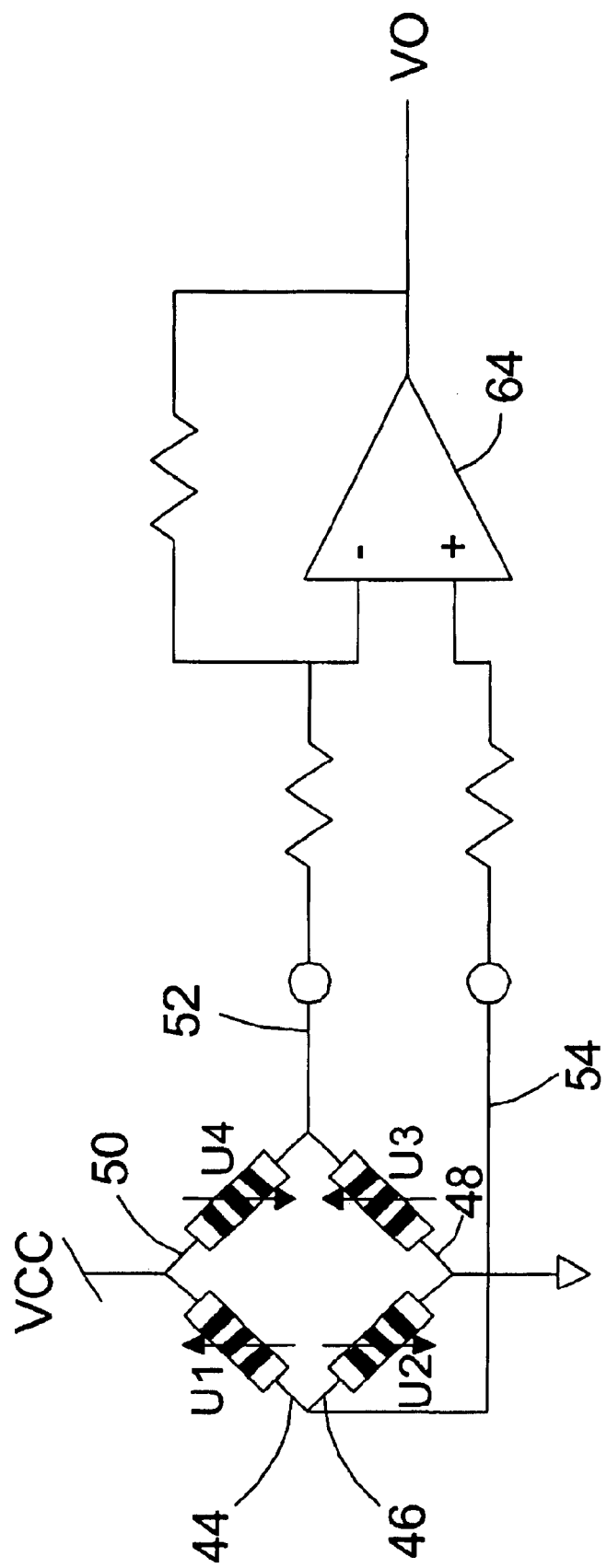
FIG. 3 is a schematic diagram illustrating the use of an MR bridge as a current sensor.

Referring to FIG. 3, an MR bridge current sensor, generally denoted at 40 is comprised of four permalloy sensing elements U1–U4 connected as a Wheatstone bridge 42 with the bridge elements forming respective bridge legs 44–50. A reference drive voltage VCC provided as the common point between legs 44 and 50 with the return provided at the common point between legs 46 and 48. The measurement voltage is obtained between leads 52 and 54, lead 52 connected to the common point between legs 48 and 50, and lead 54 connected between legs 44 and 46.

Figure 4:
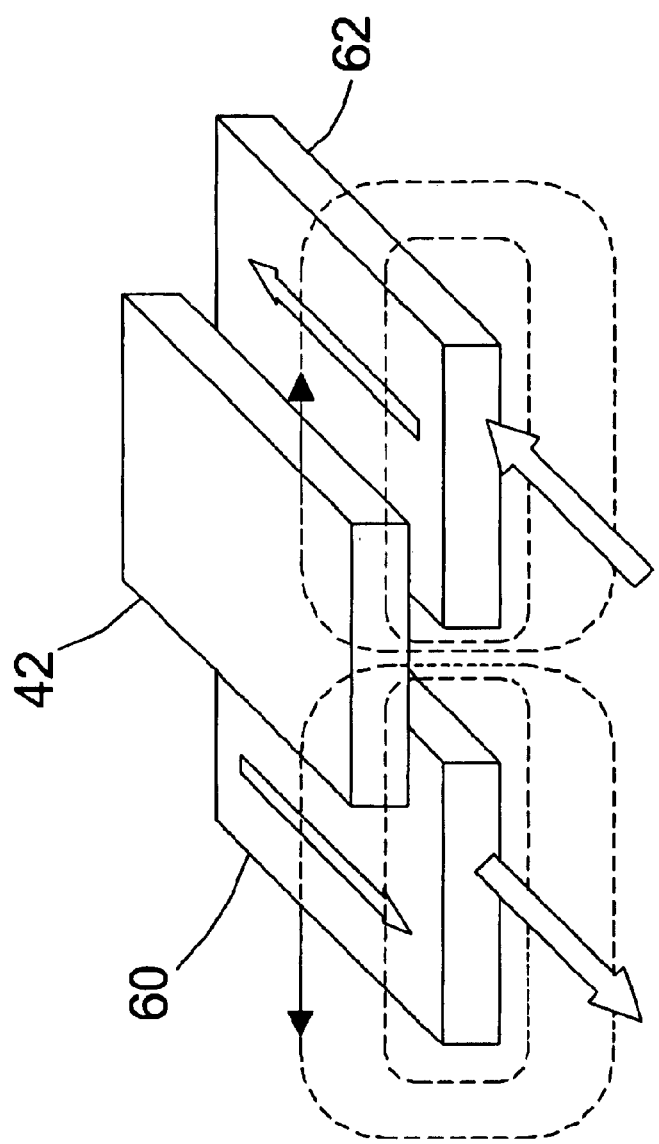
FIG. 4 illustrates the magnetic coupling of an MR bridge with internal current trace in an IC circuit.

As illustrated in FIG. 4, sensor bridge 42 is positioned so it straddles two main lead frame bars 60 and 62 which serve as current buses.

The arrows in FIG. 3 indicate conventionally the sensitivity of MR elements 44, 46, 48, and 50 to changes in magnetic flux in a given direction. Thus, elements 44 and 48 respond oppositely to elements 46 and 50. Referring again to FIG. 4, it will therefore be understood that bridge 42 is oriented with legs 44 and 48 overlying bus 60, and with legs 46 and 50 overlying bus 62.

As illustrated schematically in FIG. 4, sensor bus bars 60 and 62 are connected externally so that the noise current being measured, flows in opposite directions on the two bars. As will be understood by those skilled in the art, in this way, the common mode noise current causes proportional magnetic flux to be generated through bridge 42, with consequent changes in the resistance of sensor elements 44–50. Differential amplifier 64 (see FIG. 3) measures the voltage differential across bridge leads 52 and 54 to produce linear proportional voltage output, VO.

Figure 5:
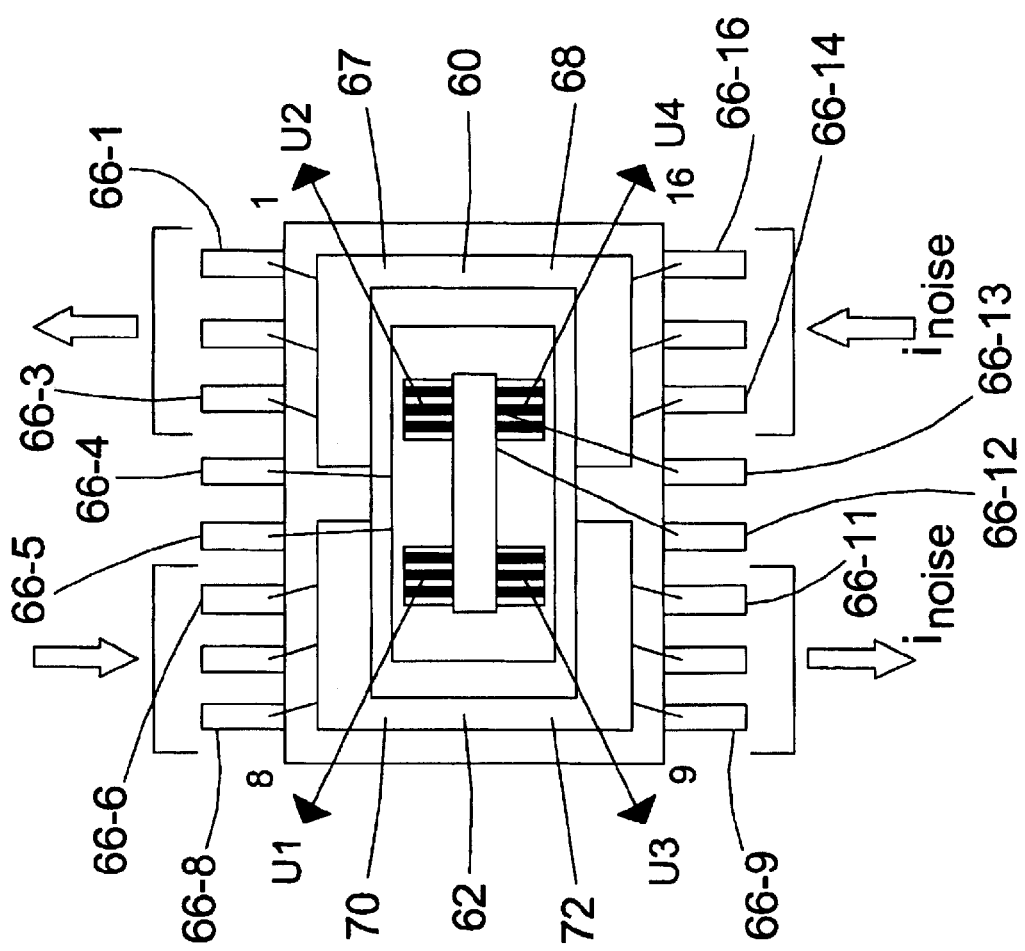
FIG. 5 illustrates an MR sensor having a unique leadframe configuration which can be used as a common mode current sensor.

Referring now also to FIG. 5, the sensor bridge 42 and lead frame bars 60 and 62, are fabricated using conventional techniques with the sensor bridge on top of the lead frame bars. In this example, a 16 pin IC package is shown, with pins 66-1 through 66-3 and 66-14 through 66-16 respectively connected to opposite ends 67 and 60, respectively, first lead frame bar 60, and pins 66-6 through 66-8, and pins 66-9 through 66-11 connected to opposite ends 70 and 72, respectively, of lead frame bar 62. Pin 66-4 is connected to the common point between sensor elements 61 and 64 to provide the reference voltage Vcc, while pin 66-5 is connected to the common point between sensor elements 42 and 43 to provide the return path for the reference voltage. Similarly pins 66-12 and 66-13 are respectively connected to the common points between sensor elements U1 and U2, and U3 and U4 to provide the signal outputs.

With the 16 pin IC connected in the manner described, the circuit can be connected so the noise current $I_{noise}$ flows in opposite directions on lead frame bars 60 and 62. Since the resulting flux splits at the center of the sensor die, i.e., the two flux paths go in opposite directions, and the flux seen by sensor elements U1 and U3 is opposite to that seen by sensor elements U2 and U4, the noise current causes opposite resistance changes between bridge legs 44 and 48 formed by sensor elements U1 and U3 as compared to bridge legs 46 and 50 formed by sensor elements U2 and U4. Therefore a sensor output can be obtained which is highly linear and proportional to the common mode noise current over a wide frequency range in a device which is easily fabricated as an IC.

Figure 6:
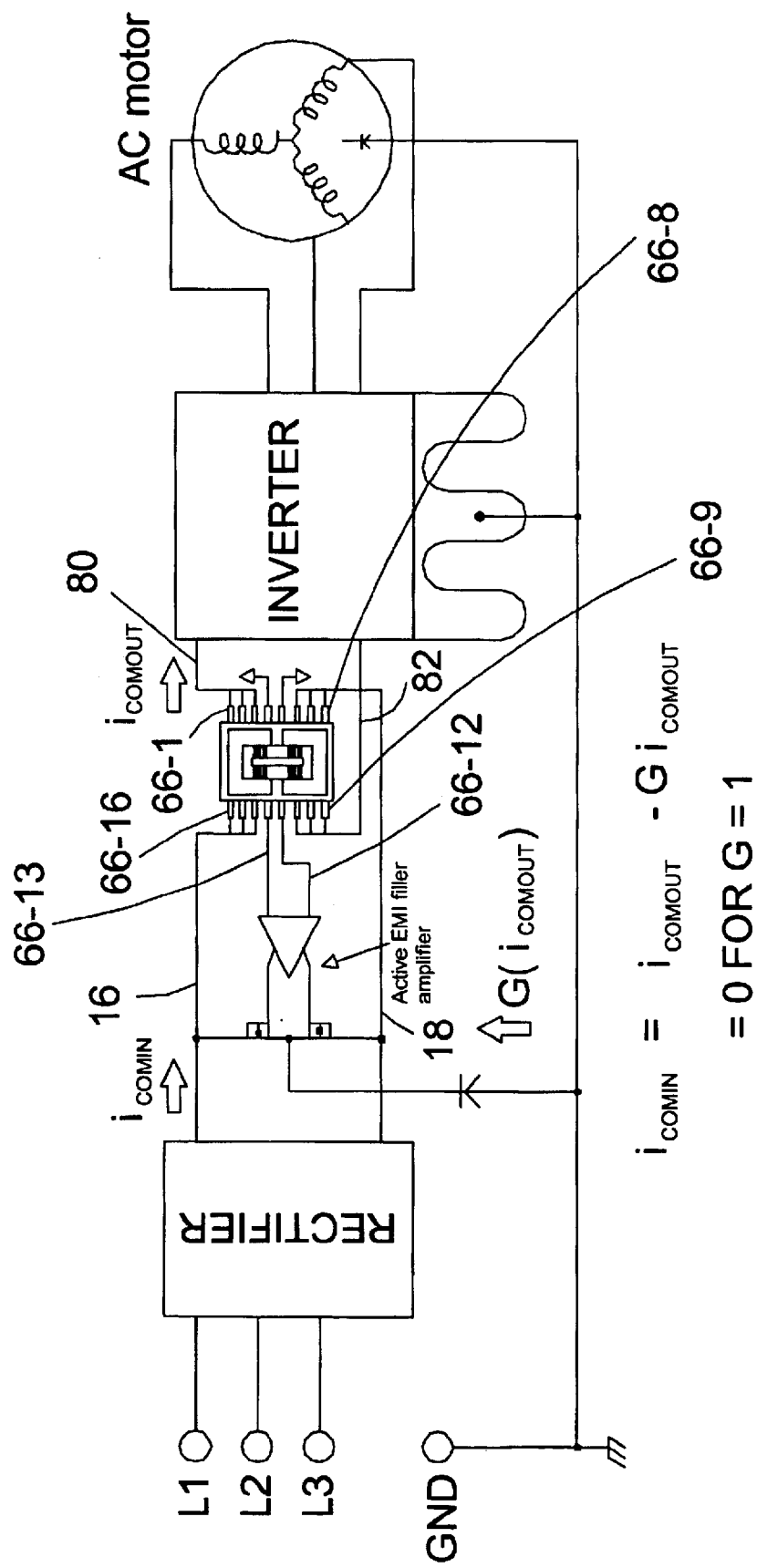
FIG. 6 is a schematic circuit of a PWM switched motor drive which uses an MR bridge as a current sensor in an active EMI filter.

An example of the use of the 16 pin MR sensor shown in FIG. 5 in an active EMI filter for a motor drive is shown in FIG. 6. In this configuration, rectifier output lead 16 is connected to end 68 of lead frame bar 60 through pins 66-14 though 66-16, and inverter input 80 is connected to end 67 of lead frame bar 60 through pins 66-1 through 66-3. However, rectifier output lead 18 is connected to the end 70 of lead frame bar 62 through pins 66-6 though 66-8, and inverter input 82 is connected to the end 72 of lead frame bar 62 through pins 66-9 through 66-11. As a result, while common mode noise current flows in opposite directions on leadframe bars 62 and 64, the D.C. current flows in the same direction through the two leadframe bars, and the sensor does not respond to bus current. Therefore sensor output VO is reflective only of common mode noise current.

Although the present invention has been described in relation to particular embodiments thereof, many other variations and modifications and other uses will become apparent to those skilled in the art. It is intended, therefore, that the present invention not be limited by the specific disclosure herein, but rather that its is to be given the full scope indicated by the appended claims.

What is claimed is:

1. A motor drive comprising:
   a current path including:
      an input for alternating current;
      a rectifier which converts the input alternating current to direct current;
      an inverter which converts the direct current to controlled alternating current;
      an output which provides the controlled alternating current to drive a motor; and
   an active EMI filter for eliminating common mode noise in the motor drive, the active EMI filter being comprised of:
      a coupling circuit connected to the current path;
      a magneto-resistive sensor which is operative to generate a time-varying signal representative of a common mode noise signal in the coupling circuit; and
      an amplifier circuit connected to the magneto-resistive sensor which is operative to insert a signal into the current path of the motor drive to substantially cancel the common mode noise signal.

2. A motor drive as described in claim 1, wherein:
   the magneto-resistive sensor is formed on a semiconductor die;
   the coupling circuit is comprised of first and second lead frame bars fabricated on the die; and
   the magneto-resistive sensor is fabricated so that it is in close proximity to and straddles the first and second lead frame bars.

3. A motor drive as described in claim 2, wherein the magneto-resistive sensor is fabricated so that it is in contact with the first and second lead frame bars.

4. A motor drive as described in claim 2, wherein the first and second lead frame bars are so connected to the motor drive current path that common mode noise signals travel in opposite directions in the lead frame bars while other signals in the current path travel in the same direction in the lead frame bars.

5. A motor drive as described in claim 1, wherein:
   the coupling circuit and the magneto-resistive sensor are formed on a semiconductor die in sufficiently close proximity to each other that the sensor is responsive to magnet flux associated with current in the coupling circuit.

6. A motor drive as described in claim 5, wherein:
   the magneto-resistive sensor is in the form of a Wheatstone including four magneto-resisitive elements,
   with opposed elements in the bridge being responsive to changes in magnetic flux in a first sense to exhibit an increase in resistance, and adjacent elements in the bridge being responsive to changes in magnetic flux in a second sense opposite to the first sense to exhibit an increase in resistance.

7. A motor drive as described in claim 6, wherein:
   the coupling circuit is comprised of first and second lead frame bars fabricated on the die; and
   the magneto-resistive sensor is fabricated so that the respective adjacent elements overlie different ones of the lead frame bars, and the respective opposed elements overlie the same one of the lead frame bars.

8. An active EMI filter for eliminating common mode noise in the motor drive, the active EMI filter being comprised of:
   a coupling circuit which is fabricated to be connected to a current path in a motor drive which current path carries a common mode noise signal;
   a magneto-resistive sensor which is operative to generate a time-varying signal representative of a common mode noise signal in the coupling circuit; and
   an amplifier circuit connected to the magneto-resistive sensor which can be coupled to insert a signal into the current path of the motor drive to substantially cancel the common mode noise signal.

9. An active EMI filter as described in claim 8, wherein:
   the magneto-resistive sensor is formed on a semiconductor die;
   the coupling circuit is comprised of first and second lead frame bars fabricated on the die; and
   the magneto-resistive sensor is fabricated so that it is in close proximity to and straddles the first and second lead frame bars.

10. An active EMI filter as described in claim 9, wherein the magneto-resistive sensor is fabricated so that it is in contact with the first and second lead frame bars.

11. An active EMI filter as described in claim 9, wherein the magneto-resistive sensor is so positioned relative to the lead frame bars that common mode noise signals traveling in opposite directions in the lead frame bars reinforce flux-induced resistance changes while signals traveling in the same direction in the lead frame bars cancel flux-induced resistance changes.

12. An active EMI filter as described in claim 8, wherein:
    the coupling circuit and the magneto-resistive sensor are formed on a semiconductor die in sufficiently close proximity to each other that the sensor is responsive to magnet flux associated with current in the coupling circuit.

13. An active EMI filter as described in claim 12, wherein:
    the magneto-resistive sensor is in the form of a Wheatstone including four magneto-resistive elements,
    with opposed elements in the bridge being so oriented that they are responsive to changes in magnetic flux in a first sense to exhibit an increase in resistance, and adjacent elements in the bridge being so oriented that they are responsive to changes in magnetic flux in a second sense opposite to the first sense to exhibit an increase in resistance.

14. An active EMI filter as described in claim 13, wherein:
    the coupling circuit is comprised of first and second lead frame bars fabricated on the die; and
    the magneto-resistive sensor is fabricated so that the respective adjacent elements overlie different ones of the lead frame bars, and the respective opposed elements overlie the same one of the lead frame bars.

* * * * *